(12) United States Patent
Wilmot et al.

(10) Patent No.: US 10,650,174 B1
(45) Date of Patent: May 12, 2020

(54) SYSTEM AND METHOD FOR VISUALIZING EVENT SEQUENCES FOR EXPRESSIONS USING BOTH HARDWARE AND SOFTWARE STATE INFORMATION

(71) Applicant: Cadence Design Systems, Inc., San Jose, CA (US)

(72) Inventors: Andrew Robert Wilmot, Carlisle, MA (US); Rohan Kangralkar, North Billerica, MA (US); George Franklin Frazier, Lawrence, KS (US); Neeti Khullar Bhatnagar, San Jose, CA (US)

(73) Assignee: Cadence Design Systems, Inc., San Jose, CA (US)

( * ) Notice: Subject to any disclaimer, the term of this patent is extended or adjusted under 35 U.S.C. 154(b) by 380 days.

(21) Appl. No.: 15/603,835

(22) Filed: May 24, 2017

(51) Int. Cl.
| | |
|---|---|
| *G06F 9/455* | (2018.01) |
| *G06F 30/20* | (2020.01) |
| *G06F 16/22* | (2019.01) |
| *G06F 13/16* | (2006.01) |

(52) U.S. Cl.
CPC .......... *G06F 30/20* (2020.01); *G06F 13/1694* (2013.01); *G06F 16/2228* (2019.01)

(58) Field of Classification Search
CPC ............................ G06F 30/20; G06F 16/2228
USPC .......................... 703/13, 14, 22, 27; 716/103
See application file for complete search history.

(56) References Cited

U.S. PATENT DOCUMENTS

| | | | |
|---|---|---|---|
| 6,745,160 B1* | 6/2004 | Ashar | G06F 17/504 703/13 |
| 8,024,511 B2* | 9/2011 | Weddle | G06F 13/1694 711/104 |
| 8,024,691 B2* | 9/2011 | Zilic | G06F 17/504 703/14 |
| 9,262,299 B1 | 2/2016 | Wilmot et al. | |
| 9,262,305 B1 | 2/2016 | Wilmot et al. | |
| 2008/0082946 A1* | 4/2008 | Zilic | G06F 17/504 716/103 |
| 2017/0091534 A1* | 3/2017 | Venkataraman | G06K 9/00302 |

* cited by examiner

*Primary Examiner* — Thai Q Phan
(74) *Attorney, Agent, or Firm* — Mark H. Whittenberger, Esq.; Holland & Knight LLP (57) ABSTRACT

The present disclosure relates to a system and method for use in an electronic design environment. Embodiments may include receiving, using at least one processor, an electronic design and generating a unique name for each hardware state element associated with the electronic design. Embodiments may further include generating a unique name for each software state element associated with the electronic design. Embodiments may also include combining a plurality of unique names into an arbitrary expression, wherein the plurality of unique names includes at least one software state unique name and at least one hardware state unique name. Embodiments may further include evaluating the arbitrary expression at one or more discrete time points. Embodiments may also include recording an evaluated expression in an electronic design database.

20 Claims, 10 Drawing Sheets

SYSTEM AND METHOD FOR VISUALIZING EVENT SEQUENCES FOR EXPRESSIONS USING BOTH HARDWARE AND SOFTWARE STATE INFORMATION

FIELD OF THE INVENTION

Aspects of the present invention relate generally to the field of system development and test, and more specifically to event-driven simulation and emulation of electronics.

Simulation of hardware components can be modeled at various levels of abstraction using event-driven simulation. Processor models in combination with hardware simulators can be used to simulate cross-compiled embedded software, for example, an operating system (OS). A collection of hardware models running such embedded software is known as a simulation platform. A simulation platform may also include models of peripherals such as memory modules, the system bus, universal asynchronous receivers (UARTs), terminals, USB devices, etc.

When the simulation platform includes processor models, it is also possible for the event-driven simulation or emulation environment to simulate the behavior of the actual cross-compiled embedded software (ESW) running on the processor models within the system. However, issues often exist with incorrect or unexpected interactions between the hardware and embedded software elements of the simulation system. To debug and analyze such problems, it is useful to record the state of the various hardware elements of the simulation platform at each discrete event or time during a simulation or emulation session to evaluate at a later date.

Processor models typically support the generation of execution traces that track the execution of instructions, register and memory accesses. The simulation platform may also allow the tracing of bus transactions, physical memory accesses and peripheral register values. These execution traces are conventionally created at run-time and can be written to a text file, database, or other log file. Such systems often contain tables mapping the physical addresses and peripheral registers such as a memory map or text file.

As previously noted, when creating debugging and analysis tools for the simulation platform, it is advantageous to have a complete knowledge of the values of system memory. Debuggers use many methods for memory value inspection if they are operating at run-time. However, for debuggers that are used after the simulation or emulation has ended (post-process debuggers), several problems arise. For example, since the simulation and debug session has been terminated, APIs that access memory values at run-time cannot be used.

Additionally, it is not possible to know in advance what memory value(s) a user might want to inspect during a post-processing debug session. Therefore it is useful to know memory values at all time points during the execution of the simulation and debug session. However, a brute force solution that stops the simulation or emulation at each tick of time and dumps the entire state of the memory is inefficient and storage intensive, and might not even work if no API exists for requesting memory values without creating new system side effects.

SUMMARY

In one or more embodiments of the present disclosure, a computer-implemented method is provided. The method may include receiving, using at least one processor, an electronic design and generating a unique name for each hardware state element associated with the electronic design. The method may further include generating a unique name for each software state element associated with the electronic design. The method may also include combining a plurality of unique names into an arbitrary expression, wherein the plurality of unique names includes at least one software state unique name and at least one hardware state unique name. The method may further include evaluating the arbitrary expression at one or more discrete time points. The method may also include recording an evaluated expression in an electronic design database.

One or more of the following features may be included. In some embodiments, the method may include indexing the electronic design database based upon, at least in part, one or more of a simulation event sequence and a simulation event time. The method may also include displaying an expression value event sequence at a graphical user interface. In some embodiments displaying may include at least one of displaying a waveform or displaying a log file. The method may include simulating at least a portion of the electronic design. The method may further include emulating at least a portion of the electronic design. In some embodiments, the software state element may include at least one software variable. The hardware state element may include at least one of a signal value or a register value.

In some embodiments, a computer-readable storage medium for electronic design simulation is provided. The computer-readable storage medium may have stored thereon instructions that when executed by a machine result in one or more operations. Operations may include receiving, using at least one processor, an electronic design and generating a unique name for each hardware state element associated with the electronic design. Operations may further include generating a unique name for each software state element associated with the electronic design. Operations may also include combining a plurality of unique names into an arbitrary expression, wherein the plurality of unique names includes at least one software state unique name and at least one hardware state unique name. Operations may further include evaluating the arbitrary expression at one or more discrete time points. Operations may also include recording an evaluated expression in an electronic design database.

One or more of the following features may be included. In some embodiments, Operations may include indexing the electronic design database based upon, at least in part, one or more of a simulation event sequence and a simulation event time. Operations may also include displaying an expression value event sequence at a graphical user interface. In some embodiments displaying may include at least one of displaying a waveform or displaying a log file. Operations may include simulating at least a portion of the electronic design. Operations may further include emulating at least a portion of the electronic design. In some embodiments, the software state element may include at least one software variable. The hardware state element may include at least one of a signal value or a register value.

In one or more embodiments of the present disclosure, a system having at least one processor is provided. The at least one processor may be configured to receive an electronic design and to generate a unique name for each hardware state element associated with the electronic design. The at least one processor may be further configured to generate a unique name for each software state element associated with the electronic design. The at least one processor may be further configured to combine a plurality of unique names into an arbitrary expression, wherein the plurality of unique names includes at least one software state unique name and at least one hardware state unique name. The at least one processor may be further configured to evaluate the arbitrary expression at one or more discrete time points, the at least one processor configured to record an evaluated expression in an electronic design database.

One or more of the following features may be included. In some embodiments, the at least one processor may be further configured to index the electronic design database based upon, at least in part, one or more of a simulation event sequence and a simulation event time. The at least one processor may be further configured to display an expression value event sequence at a graphical user interface. In some embodiments displaying may include at least one of displaying a waveform or displaying a log file.

Additional features and advantages of embodiments of the present disclosure will be set forth in the description which follows, and in part will be apparent from the description, or may be learned by practice of embodiments of the present disclosure. The objectives and other advantages of the embodiments of the present disclosure may be realized and attained by the structure particularly pointed out in the written description and claims hereof as well as the appended drawings.

It is to be understood that both the foregoing general description and the following detailed description are exemplary and explanatory and are intended to provide further explanation of embodiments of the invention as claimed.

BRIEF DESCRIPTION OF THE DRAWINGS

The foregoing and other aspects of various embodiments of the present invention will be apparent through examination of the following detailed description thereof in conjunction with the accompanying drawing figures in which similar reference numbers are used to indicate functionally similar elements.

DETAILED DESCRIPTION

According to an embodiment, a system and method are provided for constructing an accurate view of system memory over time that works without any special API from the memory model for inspecting memory values. The system memory view can be used with post-processing debug and analysis tools, but could also be employed in a real-time debugger.

The system memory view is constructed by capturing each memory execution transaction, bus transaction, and register transaction during simulation. Each captured transaction is expressed as a message that may be parsed and stored in a memory database. Changes in hardware state may also be captured and stored in a hardware state database. Switches between processes detected during the simulation may cause an update to a simulated register or memory location that will be captured as a change in hardware state and stored in a hardware database. Such process switches may occur when a breakpoint or watchpoint is detected or otherwise inserted or during a transition from a software to a hardware domain during the simulation.

Aspects of the present invention describe a system and method for providing an interface to observe the results of a simulation or emulation of a system having multiple disparate software and hardware components, including embedded software, in a post-processing debug and analysis tool.

The system memory view is created by monitoring data traces. The three basic kinds of data traces captured to create the system memory view include processor execution traces, bus transaction traces, and peripheral register traces.

An execution trace alone will rarely be enough to create an accurate representation of memory, because, for example a peripheral model (e.g. a DMA controller) can read or write directly from or to memory or a memory-mapped peripheral model with memory-mapped registers can respond to a transaction that changes its register values. However, since each memory event generates (or can be inferred from) related bus transactions or register changes, monitoring bus traces and peripheral registers in conjunction with the execution traces will allow construction of an accurate and complete representation of memory.

Figure 1:
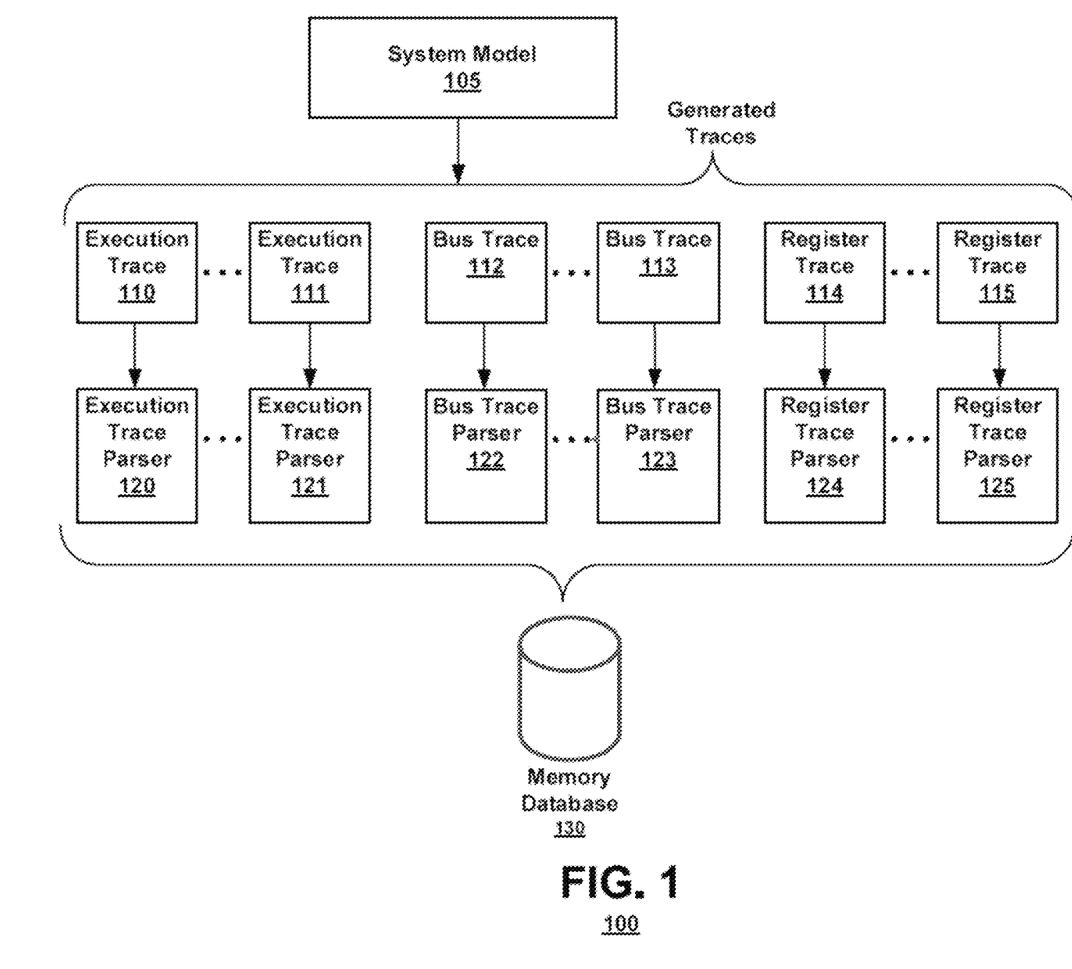
FIG. 1 is a simple block diagram illustrating components of an exemplary system according to an embodiment of the present invention.

FIG. 1 is a simplified block diagram illustrating components of an exemplary system 100 according to an embodiment. As shown in FIG. 1, a system model 105 will produce multiple traces 110-115 during simulation or emulation of the system model 105. The traces will then be captured for later use, for example, with a debugger.

According to an embodiment, the traces could be instantiated in the form of a single file, multiple files, or the trace data could arrive in groups of messages, in a database, etc. The individual traces could even be combined into a single information stream or file.

Then, from the captured traces, a trace event can be extracted. For example, events that occur either at a specific simulation time (e.g., at time 2 ns after simulation or execution start) or that occur in a specific execution sequence (e.g., the event was the 1014th that occurred after simulation or execution commenced) can be identified.

An exemplary execution trace message may include the following information: the device or element that executed the traced action (e.g., Processor X), the action that occurred (e.g., read/write), a length or number of words or lines affected (e.g., 1 word of memory), the value of the word or line (e.g., 0x01), the address that was accessed (e.g., 0x1111212), and the time the event occurred (e.g., 2 ns). The form and contents of the trace message may vary, but should provide sufficient information to extract event information in order to create a complete and accurate view of the system memory over time.

Bus transaction traces can have many formats. For example, the format of a bus trace can vary depending on the standard and system producing the trace, (e.g. the TLM 2.0 standard, ARM Tarmac Memory Bus Trace, etc.). However, a bus trace should include the following information: the initiator or master device that generated the bus transaction, the target or slave device that provides the information requested by the bus transaction, a mode such as read, write, read/write, etc., a time when the transaction occurred, the length of bytes that were requested, the address of the data that was written or read, and the data that was read or written. An exemplary bus trace message (simplified and expressed in human readable form) could be "Device dev1 reads 4 bytes of memory receiving value 0x20 from address 0x122211 of target device memory1 at time 23 ns". The form and contents of the trace message may vary, but should provide sufficient information to extract event information to contribute to a complete and accurate view of the system memory over time.

Similarly, a register trace message may include the device that interacted with the register (e.g., device dev1), the register that was affected (e.g., register R0), the value the register was changed to (e.g., 0x0), and the time the event occurred (e.g., 2 ns). The form and contents of the trace message may vary, but should provide sufficient information to extract event information to contribute to a complete and accurate view of the system memory over time.

For each source of execution, bus, or register transaction, there is a corresponding parser 120-125, that is able to parse out the trace messages to generate information about the specific values of data that resides in memory at a point in time. The parser may also understand register value changes and can build a memory map to map registers to addresses in memory. Hence when a register R0 changes to value 0x0, the parser would know that this implies memory address 0x100000 took the value 0x0 if R0 is mapped to address 0x100000.

When an execution trace parser parses out a message that either shows a memory value that it retrieved by reading from a memory or by writing a value to memory the parser commits the trace to the database 130. When a bus transaction trace parser parses out a bus transaction, it first determines whether the target device of the bus transaction is a memory being tracked in the database 130. If it is, the value that was either written or read is committed to the database 130. Bus transactions for target devices not being tracked may be ignored.

When a peripheral register trace parser parses out a register value change, it first uses a memory map to find out which address in physical memory should be updated when the register changes value. Then the value that was either written or read is committed to the database 130 using the address determined from the memory map.

A memory device such as a database 130 stores a representation of the system memory as a function of time. The database supports read and write operations. For example, an exemplary readMemory command may have the following inputs: a base address in memory, a length, and a time value. The readMemory command will then return the data from memory that was present at that time. The time value may represent simulation time, execution time, sequence, etc. The readMemory command will return either a value that was recorded from the received traces or zero if no trace operation involving the given memory address was discovered during trace parsing. An exemplary writeMemory command will include a base address, a length, a time value, and a data value that will be written to the database. According to an embodiment, the database 130 is a temporal database. Consequently, if no trace event occurred at the precise moment of time requested by the input time value, the database 130 will retrieve the value that was last set by reviewing earlier moments in time to identify the last event that affected that memory (if there was one). According to an embodiment, the database 130 could be implemented as a temporal sparse matrix or a three dimensional matrix.

According to an embodiment, an origination time is the first time when a complete physical memory dump is processed and stored in the memory database 130. This may be a logical time that relates to the time or sequence details of the simulation or execution session and may be some time after the simulation has begun (e.g., at a time greater than time 0). Any read operation that asks for a value at a time before the origination time will result in an error or a response that the value is not known.

According to an embodiment, the origination time may be set to time 0, e.g., when simulation or execution begins. Then all memory values will be presumed to be either 0 or undefined. For simplicity, and to avoid errors, all memory values may be considered to be in the "0" state at this origination time. According to an embodiment at origination time=time 0, the system may be preloaded with values in the database. For example, the initial values may be read from a file such as an Executable and Linkable Format (ELF) or Debugging With Attributed Record Formats (DWARF) compiler created file.

It is possible that multiple trace statements could contain trace messages that represent information about a memory at the same (or very time proximate) instance. For example, a value being read from a register and written to system memory will produce multiple traces. However, all such transactions can safely be written to memory because the trace information provides insight into the state of memory either via a read/write operation. In a properly functioning model or simulation, the values will be the same. According to an embodiment, conflicts of memory captured at substantially the same time may be identified, which could indicate that the model has a bug and give guidance for how to find the bug and correct the problem.

Once a complete and accurate view of system memory over the course of the simulation or emulation is captured, a debug or analysis environment can access the database 130 to read values, for example using a readMemory function, as needed to support desired operations that require knowledge of memory at given points in time.

Capturing trace information and using such information during interactive simulation and debugging is described in further detail in currently pending U.S. patent application Ser. No. 13/907,516, entitled "A Method for Interactive Embedded Software Debugging Through the Control of Simulation Tracing Components," the disclosures of which is incorporated herein by reference in its entirety.

Figure 2:
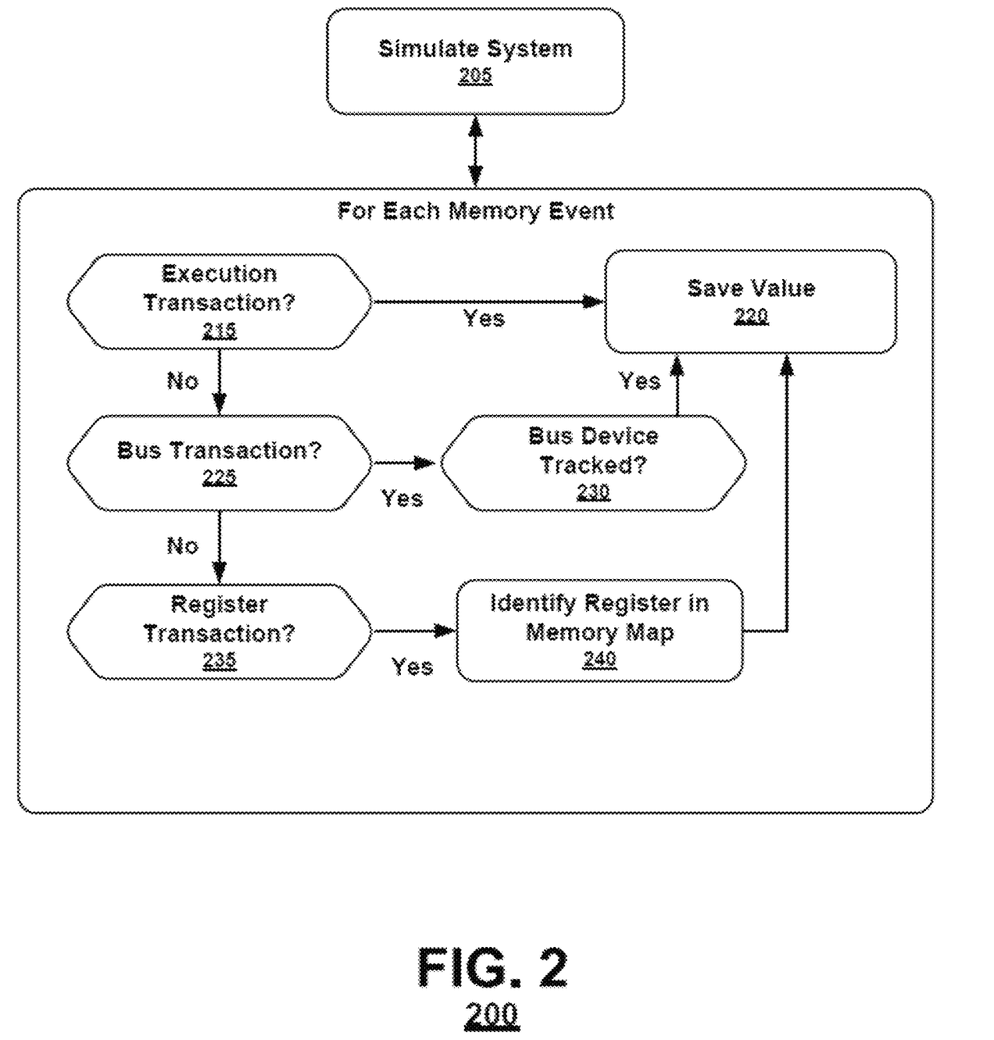
FIG. 2 illustrates an exemplary method for simulating hardware and software components implemented on a simulation platform according to an embodiment of the present invention.

FIG. 2 illustrates an exemplary method according to an embodiment. As shown in FIG. 2, initially a simulation or emulation of a system is initiated (block 205). Then, for each memory event or transaction detected, the trace of the transaction will be parsed. If the memory event is a read/write execution transaction for the system memory (block 215), then the value that was read or written to the memory is written to the memory database (block 220).

If the memory event is a bus transaction (block 225), if the transactions related to the target device of the bus transaction are being tracked (block 230), then the value transmitted on the bus is written to the memory database (block 220).

However, if the target device is not being tracked (block 230), then nothing is written to the memory database.

If the memory event is a register transaction (block 235), then the register will be identified in a memory map to identify the address of values associated with the register in the memory database (block 240). If the register was not previously mapped, a new entry in the memory database will be created and the map updated to identify the new entry associated with the register (not shown). Once the register is identified in the memory map, the value stored to or read from the register is saved to the memory database (block 220).

After each memory event is processed, the simulation will continue until the next memory event is detected or the simulation completes. Once the simulation is complete, and there are no more memory events associated with the simulation, the simulation will exit, leaving an accurate copy of the memory at any given time of the simulation.

Figure 3:
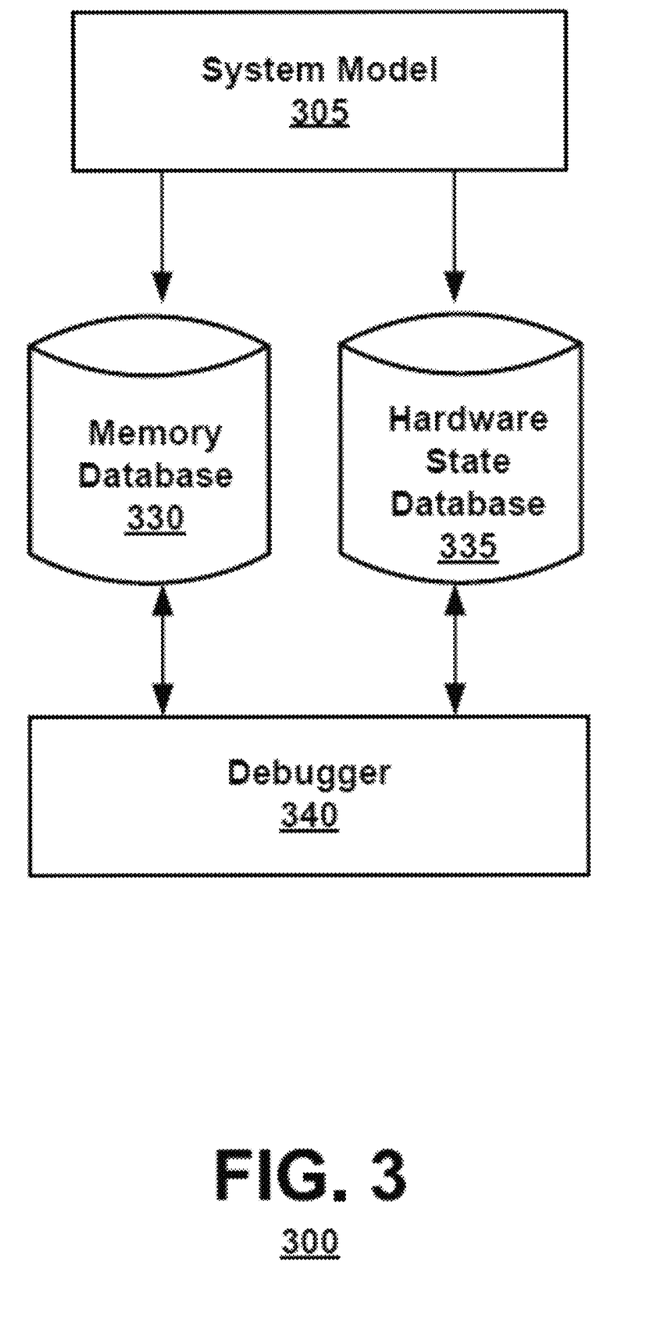
FIG. 3 is a simplified block diagram illustrating components of an exemplary system according to an embodiment.

FIG. 3 is a simplified block diagram illustrating components of an exemplary system according to an embodiment. In FIG. 3, similarly to FIG. 1 above, a system model 305 will produce multiple traces during simulation or emulation of the system model 305. The traces will then be captured and stored for later use in a memory database 330. Additionally, the state of all simulator processor registers will be stored in a hardware state database 335. The combination of the data stored in the memory database 330, the hardware state database 335, and symbolic software debugging information (e.g. Executable and Linkable Format (ELF) and Debugging With Attributed Record Formats (DWARF) compiler created files) will provide an accurate representation of the software state at any time during the simulation. This representation of the software state can later be accessed for example, with a post-processing debugger 340. The post-processing debugger can also access the state of hardware or memory at any point of the recorded simulation and compare the hardware and memory state to identify discrepancies. Therefore the debugger can be used to access information for the entire simulation platform including the software of the OS and the processes and threads of the platform, as well as the traces saved in the memory database.

According to an embodiment, a representation of embedded OS data structures and entry points will be used with the memory database 330 and hardware database 335 to implement post-processing debug and analysis capabilities for software processes and threads that were executed on the OS during simulation or emulation.

For example, a Program Counter (PC) register value that represents the location of a function in the embedded OS software that switches between processes can be searched forward or backward in the hardware state database. Similarly to the capture of the memory image in the memory database 330, this information may be captured and stored in the hardware database 335. The PC register will be monitored during simulation of the system model 305 and when a register event, transaction, or other change is detected, and trace will be transmitted to a register parser (not shown). The parser will parse the register trace and store the relevant information in the hardware state database 335. The capture of the PC register will capture the execution flow of bare-metal software and applications programs at an instruction level.

During post-process debug or other post-processing operations, when the desired PC value is found at a particular time point, then the values of memory from the memory database 330 and processor registers from the hardware state database 335 corresponding to that time point can be retrieved to reconstruct the values in OS process tables and other data structures at that particular time point. This information allows the addresses associated with arbitrary source functions or source lines in the OS process or thread that was scheduled to start at that time point to be calculated (again with the help of the symbolic software debugging information associated with the process or image running on the OS). This PC address can then be searched through in the hardware state database 335 to follow the particular line or function until a different PC value is encountered. An analogous algorithm can be devised for examining symbolic variable values in an arbitrary OS process or thread which has associated symbolic software debugging data. Similarly, values of important CPU registers can be recorded.

The insertion or creation of complex breakpoint conditions within a simulation platform is described in further detail in U.S. Pat. No. 9,262,299 entitled "Simulation Observability and Control of All Hardware and Software Components of a Virtual Platform Model of an Electronics System," U.S. Pat. No. 9,262,305 entitled "Simulation Observability and Control of All Hardware and Software Components of a Virtual Platform Model of an Electronics System," and currently pending U.S. patent application Ser. No. 13/907,516, the disclosures of which are incorporated herein by reference in their entirety.

Once the simulation has completed, and the memory and hardware databases have been populated, the captured information may be stepped through during post-processing operations. For example, a user may identify a new complex breakpoint condition according to a specified value of a variable. Then the post processing debugger will search or step through the known values of the variable as stored in the memory or hardware database in order to identify the breakpoint. This search can be performed forward or backward in time within the simulation time captured by the databases.

According to an embodiment, identifiers are constructed which unambiguously designate a particular state or element associated with a particular instance of a modeled hardware component or a particular instance, element or object of a modeled software component in the context of the entire captured simulation. Implementing global identifiers for each instance of a modeled element allows such identifiers to appear in condition expressions and action statements in the post-processing control interface and defines mechanisms for the control interface to query the memory database and the hardware state database as appropriate. Unique and unambiguous identifiers are further described in the aforementioned U.S. Patents and Patent Applications.

According to an embodiment of the present invention, to facilitate stepping through the source code of the modeled components with the post process debugger, breakpoints may be inserted as described above. During simulation, execution control may transition between the embedded software and the simulation control thread. When an operation crosses the software and hardware domains so that either the next software or hardware source code line, as appropriate, will be executed, the transition will be recorded, for example in the PC register. A user can then step through the actions performed and captured during simulation. For example, the debugger may cross the software and hardware domains so that either the next software or hardware source code line, as appropriate, will be shown to have been executed next to the user of the debugger. The user can then step through the executed lines in order from any identified point in the captured simulation. Additionally, the user will be able to step backward in time within the captured simulation.

Stepping between domains during simulation is further described in the aforementioned U.S. Patents and Patent Application.

Figure 4:
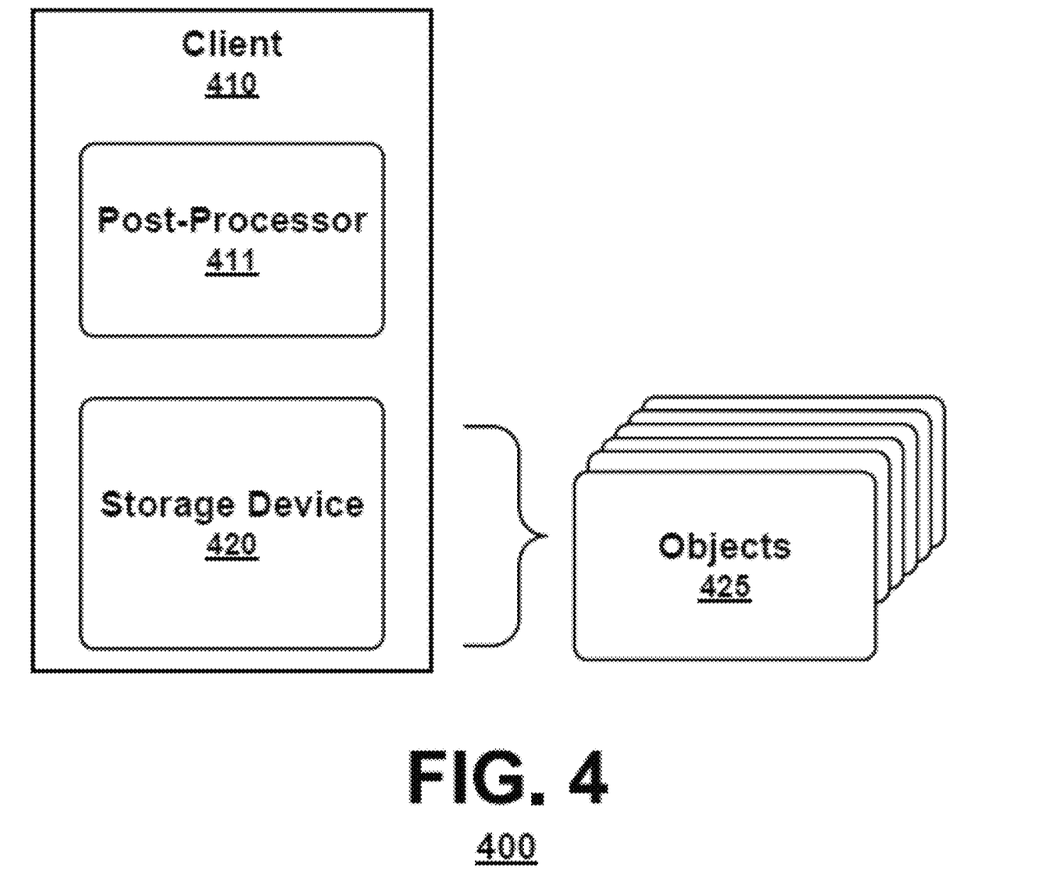
FIG. 4 is a simple block diagram illustrating components of an exemplary system according to an embodiment.

A user may access a post-processing interface in a stand-alone client system, client-server environment, or a networked environment. FIG. 4 is a simple block diagram illustrating components of an exemplary system 400 according to an embodiment. As shown in FIG. 4, a system 400 may comprise a client 410 executing a post-processor 411 and having a memory storage 420. The client 410 may be any computing system that executes a post-processor 411 or otherwise facilitates access to memory storage 420, for example a personal computer. The client 410 may include a processor that performs a method in accordance with the disclosed embodiments. Such a client would be part of an overall simulation system in accordance with the disclosed embodiments.

Hardware models, instruction sets, software packages, the hardware state database, the memory database, and other objects 425 used by the simulation system may be stored in memory storage 420. A user may access the objects 425 stored in memory storage 420 with the client 410 via a post-processing interface, where the post-processing interface is capable of accessing memory storage 420 and displaying the objects 425 and the data associated with the simulation. The post-processing interface may include a user interface, for example a program, application or middleware that acts as a frontend to and facilitates access to objects in memory storage 420. The post-processing interface may facilitate observability into the captured simulation of the modeled components using the display and edit tools and procedures described herein. The user may interact with the post-processing interface through a number of input devices, such as by inputting a selection as with a mouse or inputting a request as with a keyboard. The user may observe the simulation results on an output device or display. The post-processing interface may run in an application window controlled by the user.

As shown in FIG. 4, a client 410 may be a stand-alone system, as may be of particular interest where the components simulated are highly confidential. Additionally, according to an aspect of an embodiment as shown in FIG. 5, a client 510 may be part of a networked environment.

Figure 5:
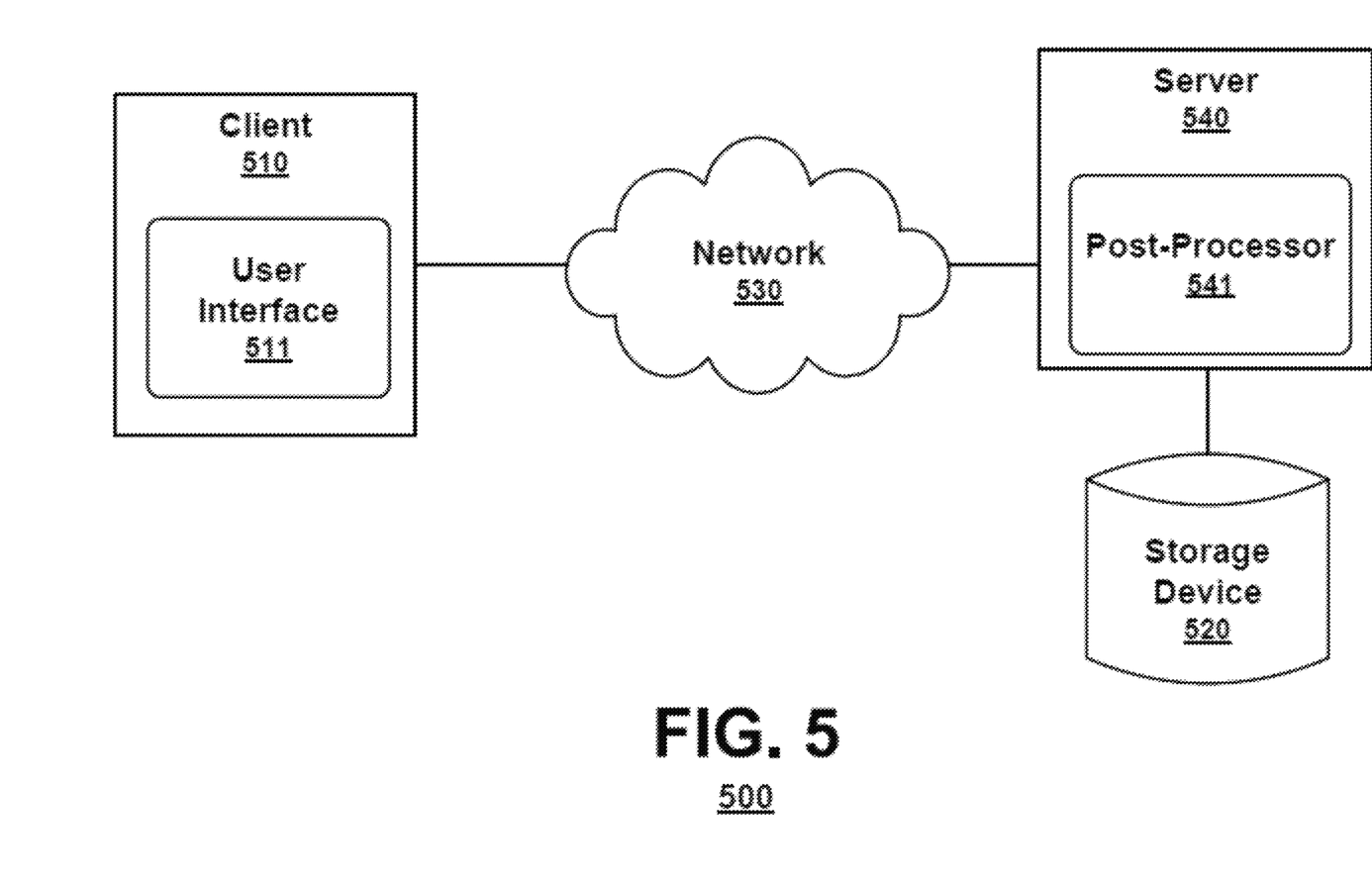
FIG. 5 is a simple block diagram illustrating components of an exemplary system according to an embodiment.

FIG. 5 is a simple block diagram illustrating components of an exemplary system 500 according to an embodiment. As shown in FIG. 5, system 500 may include a client 510 having a user interface 511. The client 510 may be connected to a server 540 via a network 530. The post-processor 541, which in this embodiment is located at server 540, may have access to storage device 520 storing hardware models, instruction sets, software packages, a hardware state database, a memory database, and other objects utilized by the simulation system. The server 540 may include a processor that performs a method in accordance with the disclosed embodiments. Such a server then would be part of the overall simulation system in accordance with the disclosed embodiments.

A user may access a post-processor 541 at the server 540 via the client 510 having a user interface 511 capable of accessing and displaying the information captured during simulation. The client 510 may be any computing system that facilitates the user accessing storage device 520, for example a personal computer. The network 530 may be a wired or wireless network that may include a local area network (LAN), a wireless area network (WAN), the Internet, or any other network available for accessing storage device 520 from the client 510.

The server 540 may be a network server accessible to the client 510 via the network 530 that may manage access to storage device 520. The user interface 511 may receive instructions regarding analyzing a simulation from the user and utilizing the objects stored in memory storage 520, facilitate a display of the simulation results queried from the described databases. Multiple different clients (not shown) may access storage device 520 via the network 530 and request access to the objects stored therein.

In another networked environment, the post-processor may be executed on a network capable client and access the other objects stored in one or more storage devices via a network and communications server.

Figure 6:
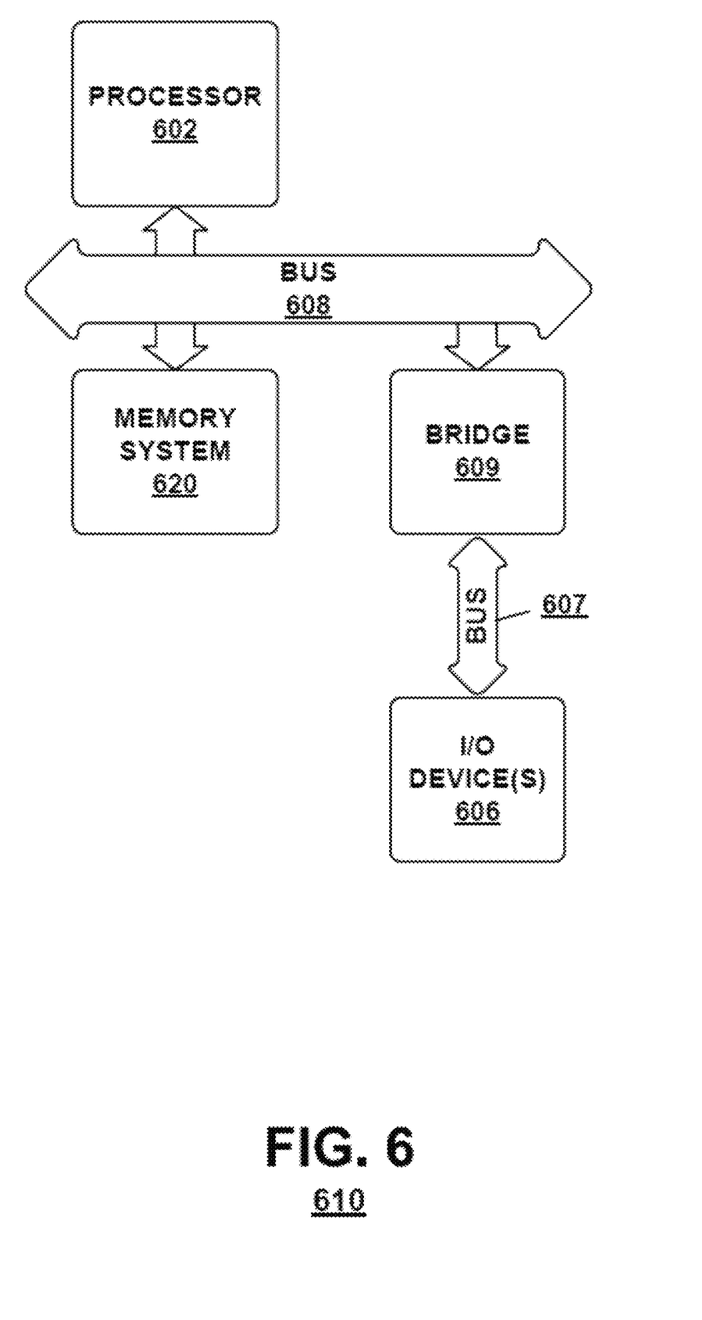
FIG. 6 is a simple block diagram illustrating components of an exemplary client according to an embodiment of the present invention.
Figure 7:
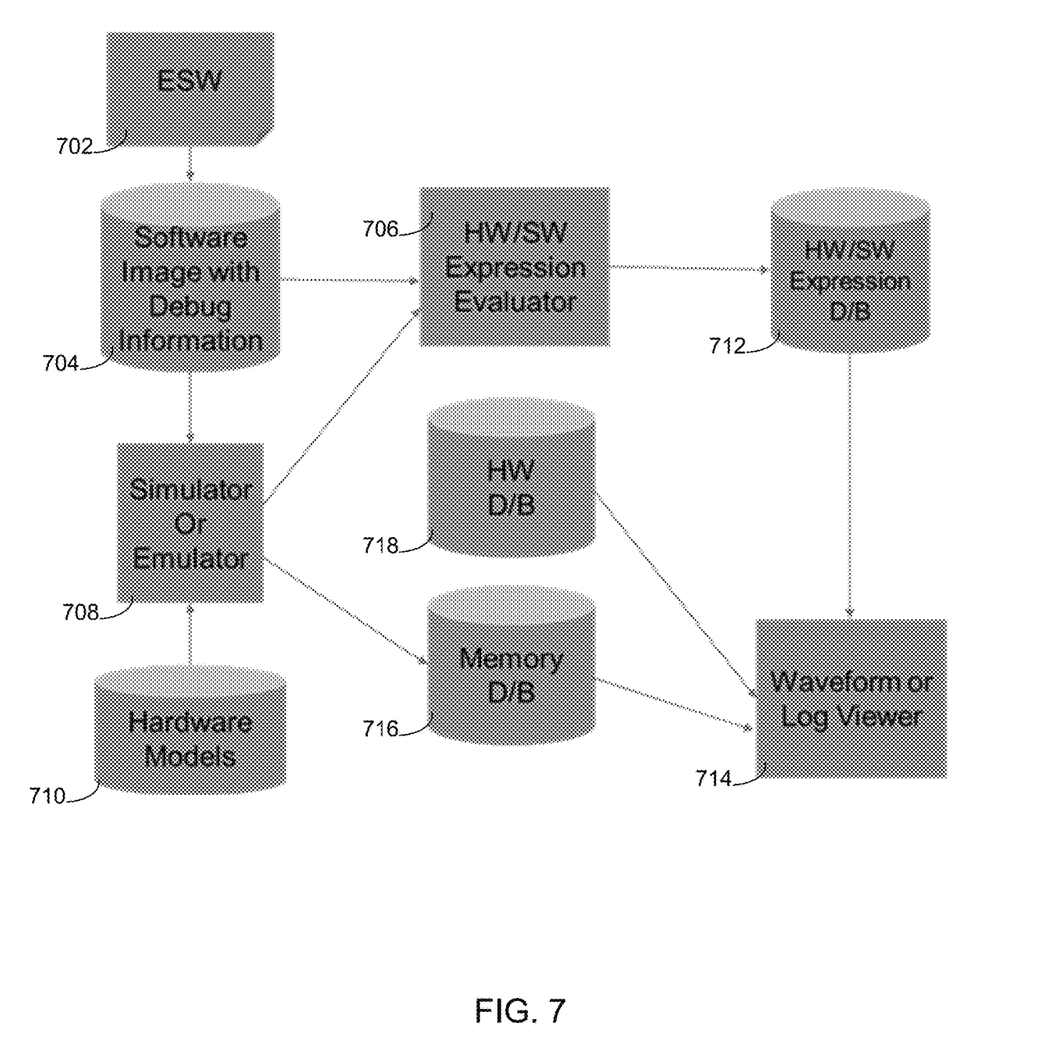
FIG. 7 is a simplified block diagram illustrating components of an exemplary system according to an embodiment.
Figure 8:
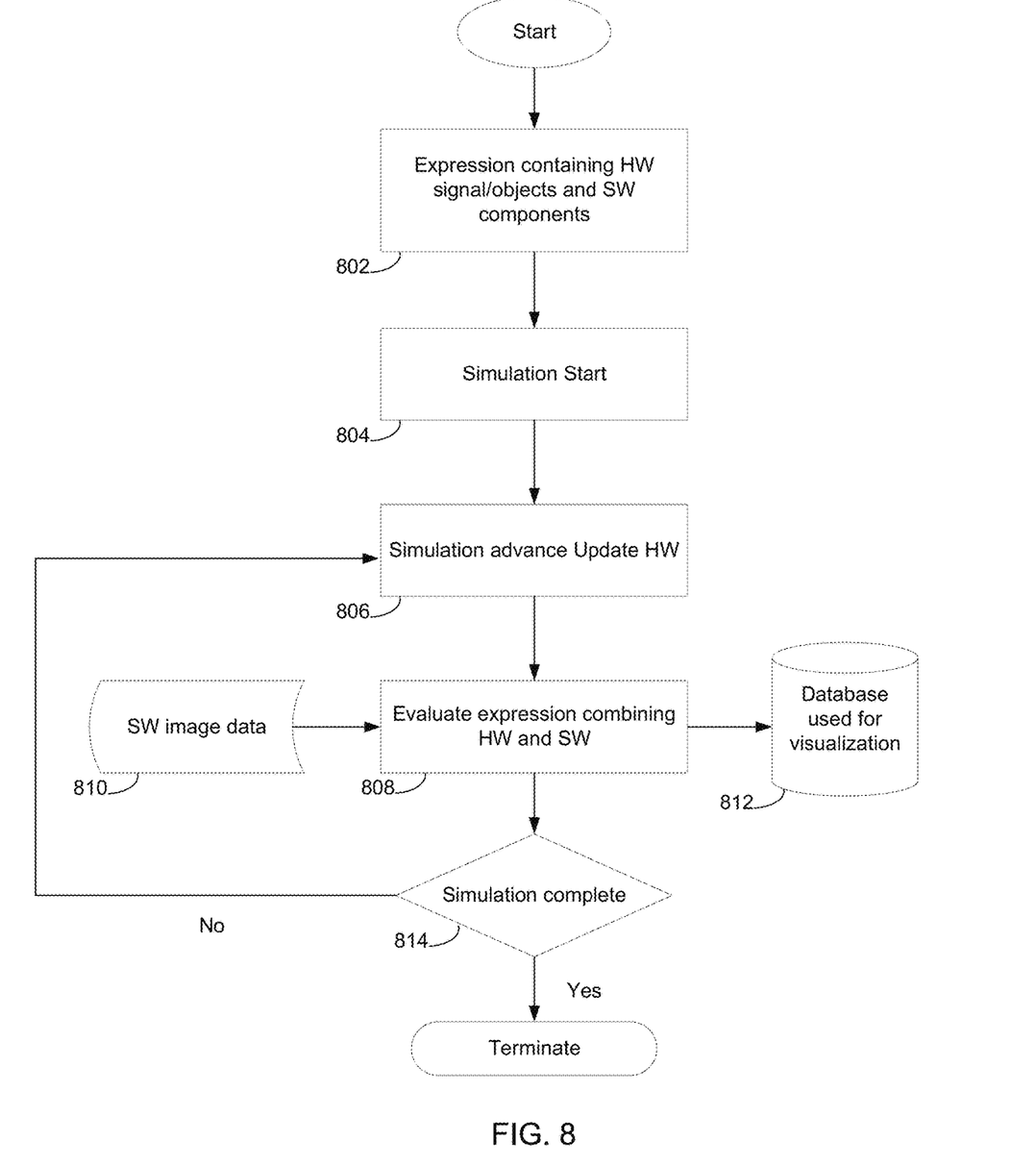
FIG. 8 is a flowchart illustrating components of an exemplary system according to an embodiment.
Figure 9:
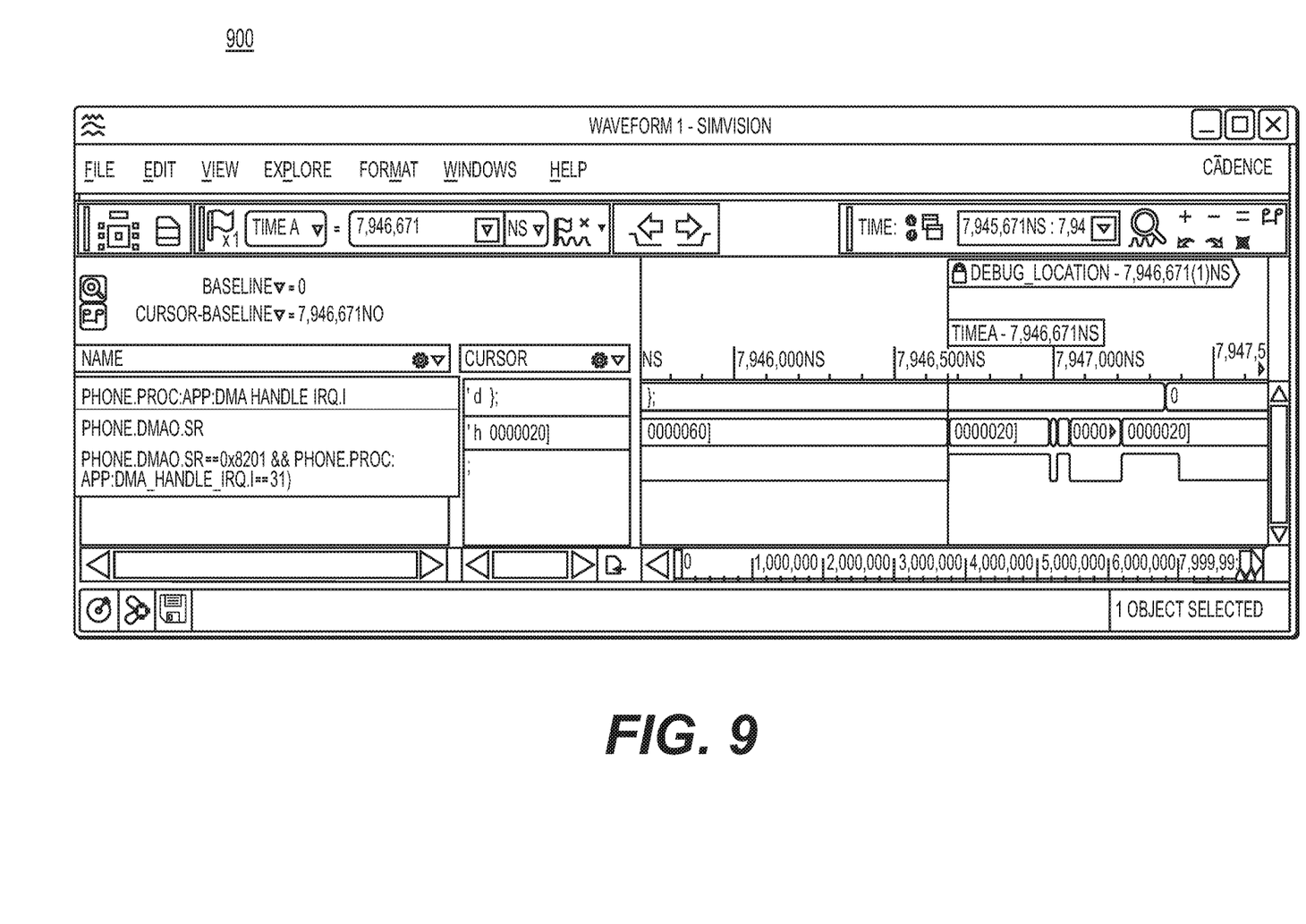
FIG. 9 is a graphical user interface illustrating components of an exemplary system according to an embodiment.

FIG. 6 is a simple block diagram illustrating components of an exemplary client 610 according to an embodiment of the present invention. As shown in FIG. 6, the client 610 configured to execute the post-processor as described herein may include a processor 602, a memory system 620 and one or more input/output (I/O) devices 606 in communication. The communication can be implemented in a variety of ways and may include one or more computer buses 607, 608 and/or bridge devices 609 as shown in FIG. 6. The I/O devices 606 can include network adapters and/or mass storage devices from which the client 610 can receive commands for executing the simulation.

Referring now to FIGS. 7-10, a number of diagrams consistent with embodiments of the present disclosure are provided. Embodiments included herein provide a process for visualizing event sequences for expressions including both hardware and software state information. As discussed above, event-driven simulation and emulation environments allow the simulation or emulation of electronics hardware elements modeled at various levels of abstraction. When the simulation includes processor models, it is also possible for the event-driven simulation or emulation environment to simulate the behavior of the actual cross-compiled embedded software running on processor models within the system. Such a collection of hardware models capable of running collections of embedded software may be referred to herein as an ESW platform 702. ESW platform 702 may be in communication with one or more software images having debug information 704, which may be configured to provide information to HW/SW expression evaluator 706 and simulator or emulator 708. Simulator or emulator 708 may be configured to access one or more hardware models 710. In some embodiments, HW/SW expression evaluator 706 may be in communication with HW/SW expression database 712. Waveform or log viewer 714 may be provided and may access one or more files from HW/SW expression database 712, memory database 716 and/or hardware database 718.

Incorrect or unexpected interactions between hardware and embedded software elements of the system are a common problem faced by developers of ESW platforms (and the corresponding actual systems that they model). Constructing visualizations of expressions that simultaneously contain state information from both software elements (e.g. software variables) and hardware elements (e.g. signal or register values) is an effective way to debug and analyze such problems. For example, an engineer may wish to see a waveform representation produced over the course of a simulation or emulation run of the logical "and" of a software variable named "irq_acknowledge" in a particular software program together with a register "IRQ_ACK"

described in a particular hardware model. Alternatively, a textual representation of the same expression may be recorded into a database indexed by time/event sequence or with time stamps into a log file.

Embodiments included herein provide a method to construct a unique name for every hardware or software state element in a simulation or emulation system. The method may combine those unique names into arbitrary expressions, evaluate those expressions at discrete simulation event time points and then record the expression evaluations into a database indexed by simulation event sequences and times. The database may then be used to visualize the expression value event sequence graphically with a waveform, textually with a log file, or using any other suitable approach.

Embodiments included herein may utilize one or more concepts described in U.S. Pat. No. 9,262,299 entitled "Simulation Observability and Control of All Hardware and Software Components of a Virtual Platform Model of an Electronics System" and U.S. Pat. No. 9,262,305 entitled "Simulation Observability and Control of All Hardware and Software Components of a Virtual Platform Model of an Electronics System," which are each incorporated by reference herein in their entirety.

Generally, an event-driven simulator runs each hardware model in a sequence using a separate host platform software thread (this thread can be a host Operating System (OS) thread or process, or as simple as a separate software call stack which is maintained for each model). The processor models allow ("bare-metal") embedded software to be executed in the simulation or emulation environment. An OS is an example of such a bare-metal program. The execution of operating systems in turn allow the execution of "application" programs (processes) and/or threads.

Embodiments included herein use a mechanism for constructing identifiers which unambiguously designate a particular hardware state item or software state item as described in U.S. Pat. No. 9,262,299 entitled "Simulation Observability and Control of All Hardware and Software Components of a Virtual Platform Model of an Electronics System". These identifiers may then be used in arbitrary arithmetic or logical expressions conforming to syntaxes defined by a given software programming language (e.g., the C programming language). These expressions may then be evaluated by the simulator or emulator at some well-defined set of event points (e.g., every discrete event in the simulator, every simulated time, every time that a program counter register for a processor model changes value, every time one of the hardware or software state items changes value, etc.) and their evaluation recorded in a database indexed by simulation time and event sequence for future visualization. The performance of the algorithm can be impacted greatly by the choice of event points at which to evaluate and record the expression to the database.

Additionally and/or alternatively, if all of the relevant simulation or emulation events have been recorded into a database for post-processing as described above, the database may be queried at the same sort of event points to evaluate the expressions that have been formed as described above and so their evaluations can be recorded in a new database indexed by simulation time and event sequence for future visualization.

Referring again to FIG. 8, a flowchart 800 depicting operations consistent with the present disclosure is provided. Operations may include generating (802) an expression containing HW signal/objects and SW components and initiating (804) a simulation. Operations may include updating (806) the hardware during simulation and receiving software image data (810) and evaluating (808) the expression combining both hardware and software. Once evaluated the result may be provided (812) to a visualization database for storage and subsequent use.

As described in U.S. Pat. No. 9,262,299 entitled "Simulation Observability and Control of All Hardware and Software Components of a Virtual Platform Model of an Electronics System," the identifier for a hardware state item may be constructed by using any suitable approach for constructing an unambiguous hierarchical path name for each model in the simulated system. For example, a register named R1 in a direct memory access (DMA) controller instance named "DMA" which is a part of a processor subsystem named "proc" which is itself part of a larger electronics system being simulated called "phone" might be named "phone.proc.DMA.R1". Similarly, an unambiguous identifier for a software state item may also be constructed within the context of a particular software program by unique hierarchical names through well established rules for different programming languages. For example, a variable "i" declared within a function "start_kernel" declared in a C program called "Linux" would have the hierarchical name "start_kernel.i". These hierarchical path names within either the hardware or software domains are then themselves hierarchically combined to form an unambiguous identifier for each hardware or software state element in the entire system. For example, to reference a variable "i" within a function "main" within a program "app" running under an OS "Linux" which is running on a processor called "phone.proc", an identifier using a different hierarchical separator (":") between each software domain and the hardware domain may be used to construct the unambiguous identifier "phone.proc:Linux:app:main.i" to unambiguously refer to that software state element. Referring again to FIG. 9, an example of a graphical user interface in accordance with the teachings of the present disclosure is provided. GUI 900 shows a waveform visualization of a software variable expression involving variable i in function handle_irq in program app running on processor core "Phone.proc" and hardware item SR in "Phone.dma0".

Embodiments included herein provide an approach for understanding when the software execution changes contexts between the OS and applications running on the OS so that software state items can be properly evaluated. The approach described in U.S. Pat. No. 9,262,305 entitled "Simulation Observability and Control of All Hardware and Software Components of a Virtual Platform Model of an Electronics System," for example, applied to the post-processing context described herein may be used.

In some embodiments, the Program Counter (PC) Register value representing the location of the function in the embedded OS software that switches between processes can be searched forward or backward in the database (or a breakpoint set during simulation). When the time point is found in the database for this PC value (or the breakpoint reached matching this PC value), then the values of memory and processor registers in the database corresponding to that time point can be used (along with the data (e.g. DWARF data) associated with the Linux kernel image) to read OS process tables and other data structures. This information allows the PC addresses associated with arbitrary source functions or source lines in the OS process or thread that was scheduled to start at that time point to be calculated (again with the help of data (e.g. DWARF data) associated with the process or image running on the OS).

Referring again to FIG. 10, a flowchart 1000 depicting operations consistent with the present disclosure is provided.

Figure 10:
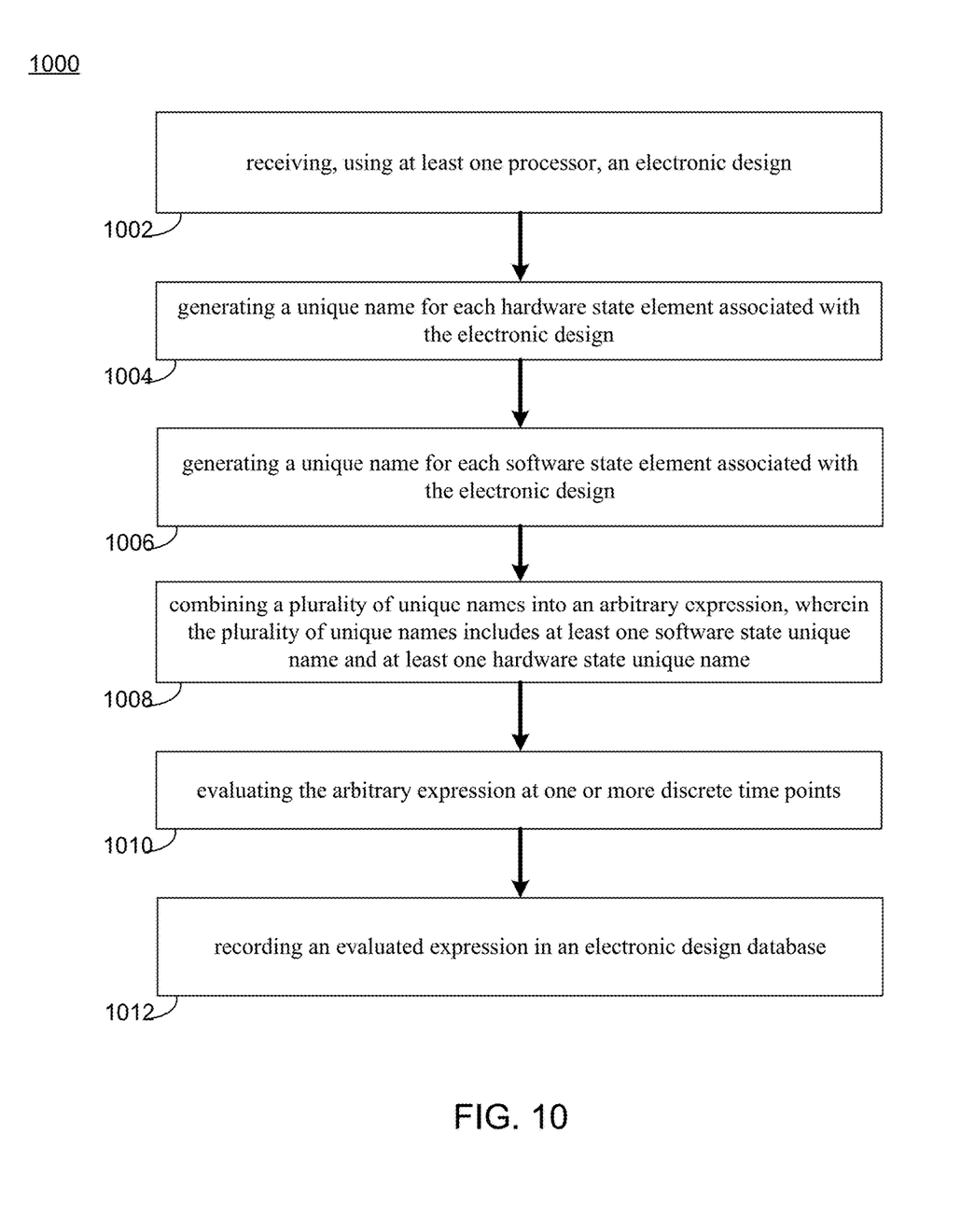
FIG. 10 is a flowchart illustrating components of an exemplary client according to an embodiment of the present invention.

Operations may include receiving (1002), using at least one processor, an electronic design and generating (1004) a unique name for each hardware state element associated with the electronic design. The method may further include generating (1006) a unique name for each software state element associated with the electronic design. The method may also include combining (1008) a plurality of unique names into an arbitrary expression, wherein the plurality of unique names includes at least one software state unique name and at least one hardware state unique name. The method may further include evaluating (1010) the arbitrary expression at one or more discrete time points. The method may also include recording (1012) an evaluated expression in an electronic design database. Numerous other operations are also within the scope of the present disclosure.

Existing approaches may allow for the visualization of expressions of HW state information sequences over simulation time. Similarly, it may be possible to visualize expressions of SW state information sequences over simulation time. Some approaches may combine multiple, arbitrary event sequences into arbitrarily complex expressions to form new event sequences that can be visualized. However, this approach wastes computational and storage resources by requiring a separate pre-calculation and recording of each event sequence prior to combination in the expression. It also requires a unique naming scheme to avoid name collisions between the combined event sequences. Embodiments included herein may be configured to avoid all of these issues.

In some applications, the modules described hereinabove may be provided as elements of an integrated software system, in which the blocks may be provided as separate elements of a computer program. Some embodiments may be implemented, for example, using a non-transitory computer-readable storage medium or article which may store an instruction or a set of instructions that, if executed by a processor, may cause the processor to perform a method in accordance with the embodiments. Other applications of the present invention may be embodied as a hybrid system of dedicated hardware and software components. Moreover, not all of the modules described herein need be provided or need be provided as separate units. Additionally, the arrangement of the blocks in FIG. 3 do not necessarily imply a particular order or sequence of events, nor are they intended to exclude other possibilities. For example, the operations depicted at blocks 315, 325, and 335 may occur in any order or substantially simultaneously with each other. Such implementation details are immaterial to the operation of the present invention unless otherwise noted above.

The exemplary methods and computer program instructions may be embodied on a non-transitory computer readable storage medium that may include any medium that can store information. Examples of a computer readable storage medium include electronic circuits, semiconductor memory devices, ROM, flash memory, erasable ROM (EROM), floppy diskette, CD-ROM, optical disk, hard disk, fiber optic medium, or any electromagnetic or optical storage device. In addition, a server or database server may include computer readable media configured to store executable program instructions. The features of the embodiments of the present invention may be implemented in hardware, software, firmware, or a combination thereof and utilized in systems, subsystems, components or subcomponents thereof.

While the invention has been described in detail above with reference to some embodiments, variations within the scope and spirit of the invention will be apparent to those of ordinary skill in the art. Thus, the invention should be considered as limited only by the scope of the appended claims.

What is claimed is:

1. A computer-implemented method comprising:
   receiving, using at least one processor, an electronic design;
   generating a unique name for each hardware state element associated with the electronic design;
   generating a unique name for each software state element associated with the electronic design;
   combining a plurality of unique names into an arbitrary expression, wherein the plurality of unique names includes at least one software state unique name and at least one hardware state unique name;
   evaluating the arbitrary expression at one or more discrete time points; and
   recording an evaluated expression in an electronic design database.

2. The computer-implemented method of claim 1, further comprising:
   indexing the electronic design database based upon, at least in part, one or more of a simulation event sequence and a simulation event time.

3. The computer-implemented method of claim 1, further comprising:
   displaying an expression value event sequence at a graphical user interface.

4. The computer-implemented method of claim 3, wherein displaying includes at least one of displaying a waveform or displaying a log file.

5. The computer-implemented method of claim 1, further comprising:
   simulating at least a portion of the electronic design.

6. The computer-implemented method of claim 1, further comprising:
   emulating at least a portion of the electronic design.

7. The computer-implemented method of claim 1, wherein the software state element includes at least one software variable.

8. The computer-implemented method of claim 1, wherein the hardware state element includes at least one of a signal value or a register value.

9. A non-transitory computer-readable storage medium having stored thereon instructions that when executed by a machine result in the following operations:
   receiving, using at least one processor, an electronic design;
   generating a unique name for each hardware state element associated with the electronic design;
   generating a unique name for each software state element associated with the electronic design;
   combining a plurality of unique names into an arbitrary expression, wherein the plurality of unique names includes at least one software state unique name and at least one hardware state unique name;
   evaluating the arbitrary expression at one or more discrete time points; and
   recording an evaluated expression in an electronic design database.

10. The non-transitory computer-readable storage medium of claim 9, further comprising:
    indexing the electronic design database based upon, at least in part, one or more of a simulation event sequence and a simulation event time.

11. The non-transitory computer-readable storage medium of claim 9, further comprising:

displaying an expression value event sequence at a graphical user interface.

12. The non-transitory computer-readable storage medium of claim 11, wherein displaying includes at least one of displaying a waveform or displaying a log file.

13. The non-transitory computer-readable storage medium of claim 9, further comprising:
simulating at least a portion of the electronic design.

14. The non-transitory computer-readable storage medium of claim 9, further comprising:
emulating at least a portion of the electronic design.

15. The non-transitory computer-readable storage medium of claim 9, wherein the software state element includes at least one software variable.

16. The non-transitory computer-readable storage medium of claim 9, wherein the hardware state element includes at least one of a signal value or a register value.

17. A system comprising:
at least one processor configured to receive an electronic design and to generate a unique name for each hardware state element associated with the electronic design, the at least one processor further configured to generate a unique name for each software state element associated with the electronic design, the at least one processor further configured to combine a plurality of unique names into an arbitrary expression, wherein the plurality of unique names includes at least one software state unique name and at least one hardware state unique name, the at least one processor further configured to evaluate the arbitrary expression at one or more discrete time points, the at least one processor configured to record an evaluated expression in an electronic design database.

18. The system of claim 17, wherein the at least one processor is further configured to index the electronic design database based upon, at least in part, one or more of a simulation event sequence and a simulation event time.

19. The system of claim 17, wherein the at least one processor is further configured to displaying an expression value event sequence at a graphical user interface.

20. The system of claim 19, wherein displaying includes at least one of displaying a waveform or displaying a log file.

\* \* \* \* \*